United States Patent
Tom et al.

(10) Patent No.: US 8,926,079 B2
(45) Date of Patent: Jan. 6, 2015

(54) INK SET

(75) Inventors: Howard S Tom, San Jose, CA (US); Doris Pik-Yiu Chun, Santa Clara, CA (US); Sivapackia Ganapathiappan, Los Altos, CA (US); Hou T. Ng, Campbell, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 614 days.

(21) Appl. No.: 13/182,226

(22) Filed: Jul. 13, 2011

(65) Prior Publication Data

US 2013/0016155 A1 Jan. 17, 2013

(51) Int. Cl.
| B41J 2/01 | (2006.01) |
| B41J 2/175 | (2006.01) |
| B41J 2/21 | (2006.01) |
| C09D 11/322 | (2014.01) |
| C09D 11/40 | (2014.01) |

(52) U.S. Cl.
CPC ............ B41J 2/17506 (2013.01); B41J 2/2107 (2013.01); C09D 11/322 (2013.01); C09D 11/40 (2013.01)
USPC ............................................ 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/01

USPC ......... 347/100, 95, 101, 96, 20, 21, 102, 103, 347/105; 106/31.6, 31.27, 31.13; 523/160, 523/161

See application file for complete search history.

(56) References Cited

U.S. PATENT DOCUMENTS

| 6,210,474 B1 | 4/2001 | Romano, Jr. et al. |
| 6,476,096 B1 * | 11/2002 | Molloy et al. ................. 523/160 |
| 2004/0201658 A1 * | 10/2004 | Jackson et al. ................. 347/100 |
| 2005/0215664 A1 * | 9/2005 | Elwakil et al. ................. 347/100 |
| 2006/0132565 A1 * | 6/2006 | Szajewski et al. ............ 347/100 |
| 2006/0189715 A1 * | 8/2006 | Ishibashi et al. .............. 523/160 |
| 2009/0085996 A1 * | 4/2009 | Kasai ........................... 347/100 |
| 2009/0281219 A1 * | 11/2009 | Watanabe et al. ............. 347/100 |
| 2010/0047454 A1 | 2/2010 | De Voeght et al. |

FOREIGN PATENT DOCUMENTS

| CN | 101560349 | 10/2009 |
| CN | 101805538 | 8/2010 |
| EP | 1285952 A1 * | 2/2003 ............. C09D 11/00 |
| WO | WO 2008/054386 | 5/2008 |
| WO | WO 2010/053480 | 5/2010 |

* cited by examiner

*Primary Examiner* — Manish S Shah
(74) *Attorney, Agent, or Firm* — Dierker & Associates, P.C.; Julia C. Dierker

(57) ABSTRACT

An ink set includes a first ink and a second ink, where each of the inks has a conductivity that is less than 200 pS/cm. The first ink includes a first pigment of a first color; a carrier fluid; and a concentration of a dispersant. The second ink includes a second pigment of a second color that is different from the first color; the same carrier fluid as the first ink; and substantially the same concentration of the dispersant as the first ink.

9 Claims, 2 Drawing Sheets

INK SET

BACKGROUND

The present disclosure relates generally to an ink set.

The global print market is undergoing a transformation from analog printing to digital printing. For digital printing, hybrid print engines have been developed that are based on advanced ink jet technology, efficient transfer printing technologies, and eco-friendly technologies. It is desirable that inks used in these hybrid print engines i) be stable, non-water based ink jettable dispersions, ii) have low conductivity to facilitate pinning of colorants onto an intermediate transfer medium, and iii) have an efficient colorant concentration. Non-water based ink jettable dispersions of different colors typically require different formulations in order to be dispersed in the non-water (i.e., oil) based carrier. When the carriers from these differently formulated inks are recycled, the recovered product is contaminated with different concentrations of different ink components. As a result, the recovered product may be unsuitable for reuse.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the ink set disclosed herein include different colored inks that are formulated with the same carrier fluid and substantially the same concentration of the same dispersant. The different colored inks can be concentrated and then re-dispersed using a dispersing fluid that includes the common carrier fluid and may contain the common dispersant therein. It is believed that the common dispersing fluid facilitates consistent ink tank and printing performance. Furthermore, since all of the colors in the ink set are formulated with the common dispersing fluid, the dispersing fluid from different colored inks can be recycled and used to formulate new printable inks of any desirable color. The ability to recycle and reuse the dispersing fluid in the preparation of other printable inks reduces the amount of post-printing carrier waste and enables a more compact ink production line.

Figure 1:
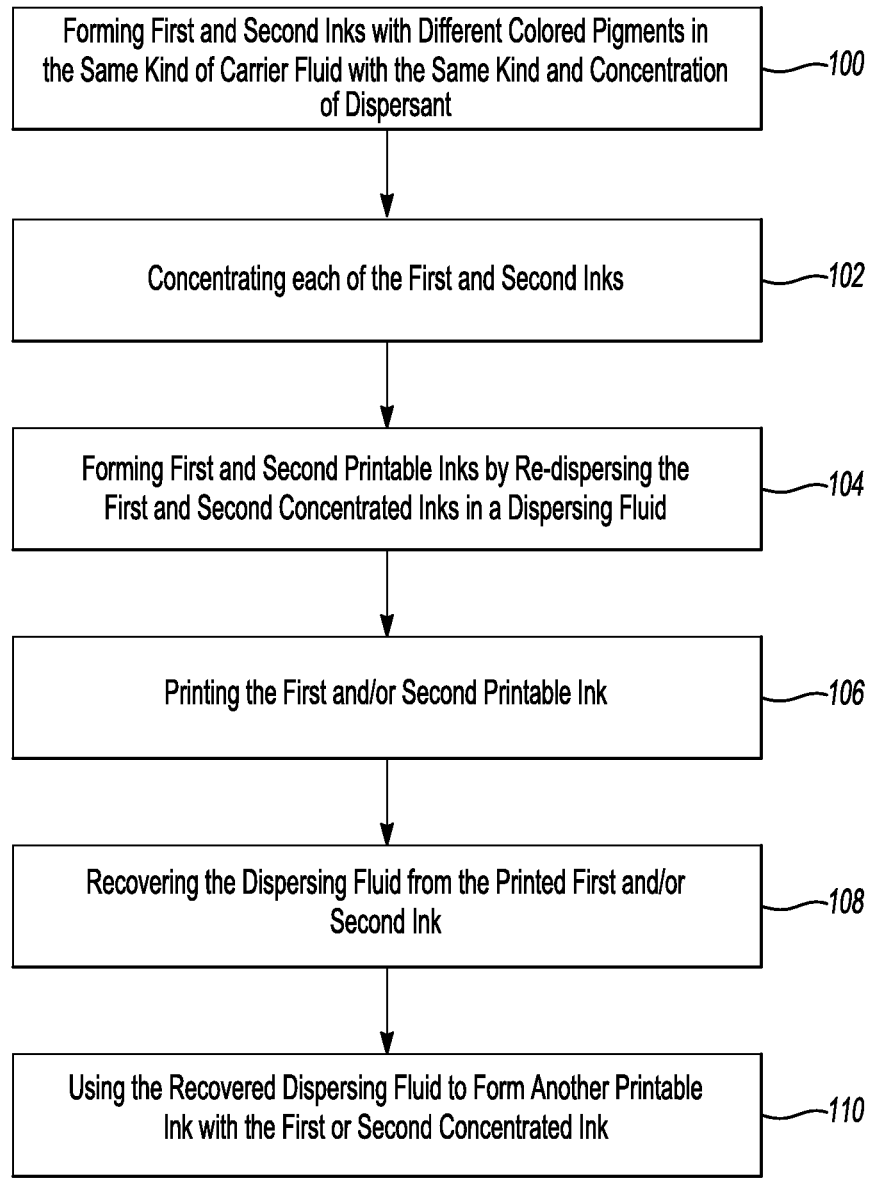
FIG. 1 is a flow diagram depicting an example of a formulating, printing, and recycling method.

FIG. 1 illustrates an example of a method that involves forming an ink set, forming concentrated inks, forming printable inks from the concentrated inks, printing the printable inks, and recovering and reusing dispersing fluid from the printed inks.

At the outset of the method shown in FIG. 1, two inks of an ink set are formed (see reference numeral 100). It is to be understood that the ink set may include any number of inks, as long as at least two of the inks are formulated with different colored pigments and all of the inks are formulated with the same carrier fluid and dispersing agent/dispersant.

When forming the inks, the pigment(s), the carrier fluid(s), the dispersant(s), and the dispersant concentration are selected so that any color ink that is made for the ink set has the same carrier fluid(s), the same dispersant(s), and about the same concentration (within 0.5 wt %) of the selected dispersant(s). As such, each ink in the ink set will include the same carrier fluid with a common set of chemical dispersant(s) at approximately the same concentration.

Any color pigments whose surface properties enable at least some of the selected dispersant to attach thereto may be used. The color pigments may be any color, including yellow, magenta, cyan, black, red, blue, green, orange, brown, white, metallic, pearlescent, etc. Low or high pigment concentration inks may be formed. In one example of a low pigment concentration ink, the amount of pigment present in each ink ranges from about 1 wt % to about 10 wt % of a total wt % of the respective ink. In another example of a low pigment concentration ink, the amount of pigment present in each ink ranges from about 3 wt % to about 10 wt % of the total wt % of the respective ink. In still another example, high pigment concentration inks can be made by using from about 20 wt % to about 95 wt % of the pigment(s).

The colorant particles may be chosen from organic or inorganic pigments that are insoluble, but dispersible in the selected carrier fluid. An example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I.

Pigment Yellow 154, C.I. Pigment Yellow 167, C.I. Pigment Yellow 172, C.I. Pigment Yellow 180, and C.I. Pigment Yellow 185.

Some examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

In another embodiment, the pigment may be chosen from metallic pigments. Some suitable metallic pigments include a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include Standard RO100, Standard RO200, and DORADO® gold-bronze pigments (available from Eckart Effect Pigments, Wesel, Germany).

In yet another embodiment, the pigment may be chosen from a pearlescent pigment (also known as an opalescent pigment). It is to be understood that suitable pearlescent pigments are those that tend to exhibit various colors depending on the angle of illumination and/or of viewing. Some examples of pearlescent pigments include those of the PRESTIGE® series and of the DORADO PX™ series, both of which are available from Eckart Effect Pigments.

The pigments may be obtained, for example, in a powder form that often contains agglomerates of pigment particles that are relatively large in size (e.g., the agglomerates may have an effective diameter that falls within the micrometer scale, 1 micron to 1000 microns). It may, in some instances, be desirable or necessary to break apart these large agglomerates so that the individual particles, or agglomerates of particles, in the inks are smaller than one micron (e.g., in some instances less than 500 nm, and in other instances less than 150 nm). Such small pigment particles/agglomerates may be obtained using the ink forming methods disclosed herein. The smaller particles or agglomerates are typically desirable because they are more easily dispersed (and re-dispersed) in the carrier fluid to form the printable inks that are jettable via ink jet.

The dispersant selected is capable of dispersing each of the pigments used for the respective inks. The dispersant selected is a multi-chain and multi-anchor dispersant. This type of dispersant provides multiple anchors for attachment to the selected pigment(s) and multiple chains extending into the carrier fluid. In one example, the dispersant is a polyisobutylene succinimide having i) a polyisobutylene chain with a molecular weight ranging from about 800 to about 3000 and ii) an amine value ranging from about 10 mg KOH/g to about 100 mg KOH/g. The polyisobutylene succinimide may be dispersed in mineral oil(s). In some examples, the mineral oil(s) include about 50% of the polyisobutylene succinimide. Examples of suitable commercially available dispersants include SOLSPERSE® 9000, SOLSPERSE® 21000, and SOLSPERSE® 11000, all of which are available from Lubrizol Corp., Wickliffe, Ohio.

The amount of the dispersant in each of the inks in the ink set depends, at least in part, upon the amount of pigment used. In one example, the amount of dispersant ranges from about 5 wt % to about 100 wt % with respect to the weight percentage of the pigment(s) used. In another example, the amount of dispersant ranges from about 0.5 wt % to about 1.5 wt % of the total wt % of the respective ink.

The carrier fluid may be any non-polar, oil-based carrier fluid. Examples of suitable non-polar carrier fluids include aliphatic hydrocarbons, such as hexanes, heptanes, hexadodecanes, and ISOPAR™ isoparaffinic fluids (Exxon Mobil, Houston, Tex.). The amount of carrier fluid included in each ink makes up the balance of the ink. For example, if about 5 wt % pigment and about 1 wt % dispersant (made up of about 50% polyisobutylene succinimide and about 50% heavy oil) are used, the ink will include about 93 wt % carrier fluid.

Each of the inks of the ink set may be made, for example, by adding the selected pigment particles and dispersant(s) to the carrier fluid(s), or visa versa, and then mixing them together by mechanical means (e.g., stirrer, shaker, homogenizer, blender, or the like) and/or by ultrasonic agitation. The initial mixing process may be performed to reduce the particle size of the pigment(s). As two examples, the mixture may be sonicated in a probe sonicator or milled to reduce the particle size of the pigment(s). The mixture may then be further processed, e.g., via bead milling, microfluidization, ultrasonic agitation, high shear mechanical mixing, or the like, in order to disperse the pigment(s) further. In one example, the additional processing is accomplished using a microfluidizer at maximum pressure. The mixture may be processed for an amount of time sufficient to deagglomerate and further disperse the pigment particles, thereby forming the ink.

The process time, ink conductivity, and particle size may be monitored throughout processing in order to achieve inks with desirable properties. Particle size may be monitored, e.g., via dynamic light scattering (DLS). Conductivity may be monitored with a conductivity meter (e.g., Hand Held Conductivity Meter from D-2 Inc.). In one example, each of the inks of the ink set has a conductivity that is less than 200 pS/cm and an average pigment particle size that is less than 500 nm.

Once formulated, the inks may be concentrated, as shown at reference numeral 102 of FIG. 1. The removal of all or a portion of the liquid component(s) (e.g., the non-polar carrier fluid) to form the concentrated ink may be accomplished using a number of different techniques. Examples of these techniques include centrifugation, electromechanical squeezing, filtration, thermal evaporation (e.g., using an energy efficient heat pump) and/or belt-drying, and some of these examples are described in some detail hereinbelow.

In one example, centrifugation may be used in instances when the pigment particles have a higher density than the liquid component(s). Centrifugation in this case may suitably separate the more dense pigment particles (and other solids) from the liquid. For instance, the ink may be placed in a centrifuge, which spins at a predetermined rate. Centrifugal forces cause the more dense colorant particles to separate away from (e.g., they may settle towards the outer diameter of the centrifuge) the less dense liquid component(s). The speed, time, and/or temperature of the centrifuge may be controlled to control the separation of the colorant particles from the liquid component(s). After centrifugation, decanting may be performed to remove the separated liquid component(s). In an example, most of the liquid component(s) (e.g., at least 80%) may be removed via decanting. Although decanting removes most of the liquid component(s), it is to be understood that some of the liquid component(s) typically remains with the solids.

Another example of removing all or the portion of the liquid component(s) includes filtration. In this technique, the pigment particles (and other solids) may be extracted from the liquid component(s) using filters with appropriately sized pores. It is to be understood that a small amount of the liquid component(s) typically remains on the filtered non-volatile solids (NVS).

Yet another example of removing all or the portion of the liquid component(s) includes evaporation of a selected portion of the liquid component(s). This may be accomplished by heating the liquid component(s) for an amount of time sufficient to evaporate a selected portion of the liquid component(s). Upon heating, the vapor pressure of the liquid component(s) increases, which causes the liquid component(s) to change phase and separate from the colorant particles. The rate of evaporation may also be increased by passing air over the liquid component(s), or by operating the evaporation in a vacuum.

As one example, evaporation may be accomplished by spray drying, where a fine particle mist of the ink is sprayed, e.g., from a nozzle. During the spray drying, the ink is converted into a flow of small diameter droplets (e.g., less than 1 mm in diameter), which increases the surface area-to-volume ratio of the deagglomerated ink. Since the evaporation rate is proportional to the liquid surface area, evaporation from a large number of small droplets will be faster than evaporation from a single large droplet having the same volume.

The concentrated inks each include non-volatile solids (NVS) present in an amount ranging from about 20 wt % to about 90 wt % of the concentrated ink. Once the concentrated ink(s) has/have been formed, the ink(s) may be packaged and stored and/or shipped.

Figure 2:
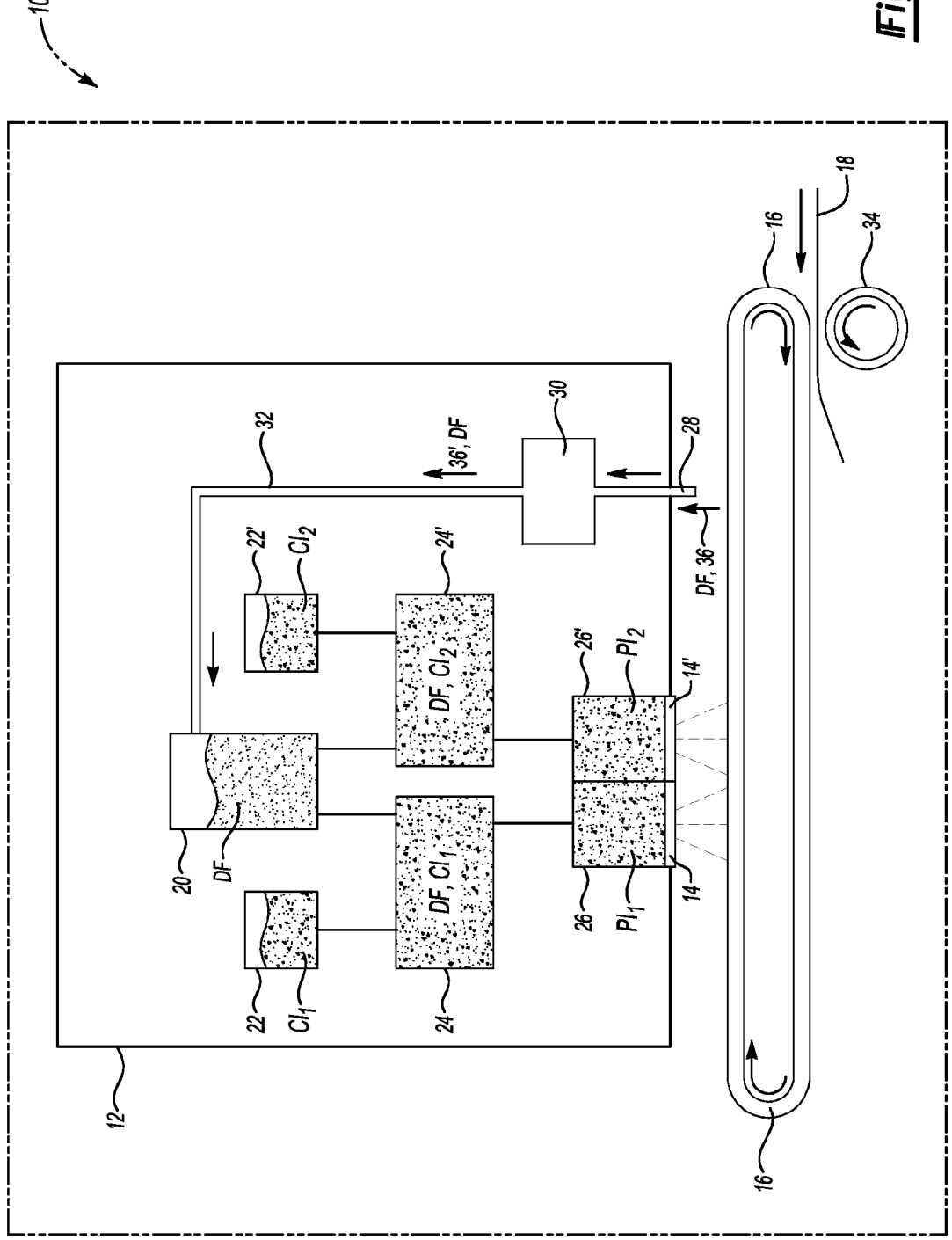
FIG. 2 schematically depicts an example of a printing system utilizing an example of the ink set disclosed herein.

The concentrated inks disclosed herein may be used in a variety of printing systems, one example of which is shown in FIG. 2. The remaining steps of the method shown in FIG. 1 will be described in conjunction with FIG. 2.

The printing system 10 shown in FIG. 2 generally includes a hybrid ink jet/liquid electrophotographic printer 12 having printheads 14, 14' for dispensing the colored inks $Cl_1$, $Cl_2$ of the ink set. It is to be understood that although two printheads 14, 14' are shown in FIG. 2, there may be any desirable number of printheads 14, 14'. The printheads 14, 14' are generally configured to eject a portion of the printable ink jet inks $PI_1$, $PI_2$ onto an intermediate transfer medium 16 to form a printed image which is ultimately transferred to a desirable medium 18.

This example of the printer 12 further includes ink containers 22, 22'. Each container 22, 22' contains one of the concentrated inks $Cl_1$, $Cl_2$. In one example, the ink containers 22, 22' are removable from the printer 12, and thus the ink containers 22, 22' (which contain the concentrated inks $Cl_1$, $Cl_2$) are shipped and/or stored by themselves (i.e., without the printer 12). In some cases, the printer 12 and the ink container 22, 22' without the concentrated inks $Cl_1$, $Cl_2$ may be packaged together and then stored and/or shipped together. In these cases, the concentrated inks $Cl_1$, $Cl_2$ are added to the respective ink containers 22, 22' when desired and/or needed at the printing facility.

The ink containers 22, 22' containing the concentrated inks $Cl_1$, $Cl_2$ are placed or otherwise installed inside the printer 12 so that the ink containers 22, 22' are in selective fluid communication with one or more dispersers 24, 24'. In the example shown in FIG. 2, each ink container 22, 22' is in selective fluid communication with a respective disperser 24, 24'. The concentrated ink $Cl_1$ from container 22 is delivered to disperser 24, and the concentrated ink $Cl_2$ from container 22' is delivered to disperser 24'. While two separate dispersers 24, 24' are shown in FIG. 2, it is to be understood that a single disperser may be used, which includes separate compartments for receiving a respective one of the concentrated inks $Cl_1$, $Cl_2$.

Each of the dispersers 24, 24' is also in selective fluid communication with a dispersing fluid reservoir 20 containing a dispersing fluid DF which includes i) fresh carrier fluid, recycled carrier fluid, or combinations thereof; and may include ii) recycled dispersant. In one example, the fresh carrier fluid is carrier fluid alone. In another example, the fresh carrier fluid also includes fresh dispersant at a concentration that matches the concentration of dispersant used to originally form the inks of the ink set. It is to be understood that since at least some of the dispersant in the dispersing fluid DF is recycled from printed printable inks (as described further below), the concentration of the dispersant in the dispersing fluid DF matches the concentration of dispersant used to originally form the inks of the ink set (i.e., prior to concentration). As such, the concentration of the dispersant in the dispersing fluid DF remains constant. The dispersing fluid DF can be delivered to any or all of the dispersers 24, 24' depending upon which printable ink $PI_1$, $PI_2$ is to be made.

The dispersing fluid DF may be introduced into the dispersing fluid reservoir 20 by i) introducing a fresh carrier fluid into the printing system 10, e.g., via reservoir 20, and/or ii) recycling a carrier fluid and dispersant previously used by the printing system 10. In instances where fresh carrier fluid(s)

are introduced, the dispersing fluid DF may be formulated, bought, or otherwise obtained by the operator of the printing system 10 from an external source and input into the printer 12 (e.g., a removable reservoir 20). The reservoir 20 may also be a permanent part of the printer 12 that can be refilled with fresh carrier fluid. In one example, after the first instance of printing, the printer 12 will recycle used carrier fluid, which may contain some dispersant. As such, the dispersing fluid DF may originally be fresh carrier fluid, and after printing is commenced, will be a mixture of fresh and recycled carrier fluid(s) and recycled dispersant(s).

A processor (not shown) is operatively connected to the containers 22, 22' and the reservoir 20. The processor is capable of running suitable software routines or programs for receiving desirable digital images, and generating commands for the containers 22, 22' and the reservoir 20 to dispense suitable amounts of the concentrated ink(s) $Cl_1$, $Cl_2$ and dispersing fluid DF in order to make printable ink(s) that will be used to print the digital images. The processor is also configured to transmit suitable commands to the other parts of the printing system 12 in order to print the desired images.

The dispersers 24, 24' receive the respective concentrated ink $Cl_1$, $Cl_2$ and the dispersing fluid DF in amounts suitable for re-dispersing the concentrated inks $Cl_1$, $Cl_2$ into the dispersing fluid DF to form printable inks $Pl_1$, $Pl_2$ (see reference numeral 104 in FIG. 1). Delivery of the concentrated ink(s) $Cl_1$, $Cl_2$ and the dispersing fluid DF may be accomplished via any suitable pumping architecture or other delivery means inside the printer 12. Once the components $Cl_1$ or $Cl_2$ and DF are dispensed into the disperser 24 or 24', the disperser 24, 24' mixes the components $Cl_1$ or $Cl_2$ and DF together. As such, the dispersers 24, 24' act as mixing tanks for producing the printable inks $Pl_1$, $Pl_2$ from the components $Cl_1$ or $Cl_2$ and DF. The dispersers 24, 24' may be chosen from any suitable equipment to accomplish re-dispersion of the concentrated inks $Cl_1$, $Cl_2$. For instance, if dispersing is accomplished via mechanical mixing, the dispersers 24, 24' may take the form of a high shear mixer. In another instance, if dispersing is accomplished via ultrasonic mixing, the dispersers 24, 24' may take the form of an agitator. Other dispersers 24, 24' may include equipment for high pressure mixing, equipment for mechanical pumping, and/or the like.

The printable ink(s) $Pl_1$, $Pl_2$ is/are formed in amount(s) that is/are suitable for a then-current print job. After being formed in the respective dispersers 24, 24', the printable ink(s) $Pl_1$, $Pl_2$ is/are then routed to respective fluid ejection devices (e.g., cartridges) 26, 26' that are in operative communication with the respective printhead(s) 14, 14' for dispensing the inks $Pl_1$, $Pl_2$ from the printer 12.

During printing (see reference numeral 106 of FIG. 1), the ink(s) $Pl_1$, $Pl_2$ is/are deposited onto a heated intermediate transfer medium 16 (which is a rotating belt or drum). In one example, the pigment(s) of the ink(s) $Pl_1$, $Pl_2$ are pinned onto the intermediate transfer medium 16 by corona discharge. As the heated intermediate transfer medium 16 rotates, the dispersing fluid DF, which begins to evaporate, can be recovered from the printed ink(s) $Pl_1$, $Pl_2$. As mentioned above, the dispersing fluid DF includes the carrier fluid, which may contain at least some of the dispersant. A dispersing fluid recovery system, including, for example, a suction tube 28, a condenser 30, and tubing 32, is used to recover the printed dispersing fluid DF (se reference numeral 108 of FIG. 1). In one example, the deposited ink(s) $Pl_1$, $Pl_2$ is/are moved such that it/they pass(es) by the suction tube 28, which collects the evaporated dispersing fluid DF 36 and leaves the ink solid(s) (not shown) on the intermediate transfer medium 16. Other collection mechanisms include squeegee or air-knife. The collected evaporated dispersing fluid DF 36 is condensed via a condenser 30 and then the condensed dispersing fluid DF 36' is passed back to the dispersing fluid reservoir 20 via tubing 32 or another suitable mechanism. The recycled dispersing fluid DF 36' may be filtered after being condensed and before being delivered back into the reservoir 20. Since the recycled dispersing fluid DF 36' includes the same carrier fluid(s) and, in some instances, dispersant(s) used to originally form the inks from which the concentrated inks $Cl_1$, $Cl_2$ were made, the recycled dispersing fluid DF 36' may be used when formulating more printable ink(s) $Pl_1$, $Pl_2$ from the concentrated ink(s) $Cl_1$ or $Cl_2$ (see reference numeral 110 of FIG. 1).

As the intermediate transfer medium 16 continues to rotate, the ink solids remaining thereon are contacted with a medium 18 that is fed between the intermediate transfer medium 16 and an impression drum 34. The ink solid(s) from the intermediate transfer medium 16 transfers to the medium 18 to form the desired image thereon.

While the example shown in FIG. 2 is a hybrid ink jet and liquid electrophotographic printer, it is to be understood that the ink set disclosed herein may be used with other ink jet printers (e.g., piezoelectric ink jet printers, thermal ink jet printers, etc.)

The following Example is provided to illustrate the ink set of the present disclosure. It is to be understood that this Example is provided for illustrative purposes and is not to be construed as limiting the scope of the disclosure.

EXAMPLE

Four different colored inks were prepared with a common fluid carrier (ISOPAR® L, referred to in this example as "oil-based carrier") and a common dispersant (SOLSPERSE® 11000, referred to in this example as "dispersant").

The first ink was a yellow ink. 5% yellow pigment (PY 37) and 1% dispersant were mixed with the oil-based carrier. The ink was mixed and sonicated in a probe sonicator at 50% amplitude for 30 minutes to reduce particle size in the dispersions. The mixture was added to a microfluidizer and processed at maximum pressure of 110 psi to disperse the pigments further. The yellow ink was processed in the microfluidizer for 30 minutes. The resulting ink was a yellow dispersion with conductivity of 88 pS/cm and an average particle size of 220 nm. The yellow dispersion was concentrated in an oven at 60° C. for about 8 hours, and the evaporated sample had an NVS of 83%. The concentrated yellow ink was redispersed by adding back the same amount of oil-based carrier and stirring the mixture via high-speed mechanical stirring. The re-dispersed yellow pigment dispersion was printed using a piezoelectric ink jet printer having a Dimatix Q-class printhead at 45 volts, 7 µs, 50 kHz and a drop velocity of 7.1 m/s. The resulting print exhibited no satellites.

The second ink was a magenta ink. 5% magenta pigment (PR 102) and 1% dispersant were mixed with the oil-based carrier. The ink was mixed and sonicated in a probe sonicator at 50% amplitude for 30 minutes to reduce particle size in the dispersion. The mixture was added to a microfluidizer and processed at maximum pressure of 110 psi to disperse the pigments further. The magenta ink was processed in the microfluidizer for 30 minutes. The resulting ink was a magenta dispersion with conductivity of 113 pS/cm and an average particle size of 440 nm. The magenta dispersion was concentrated in an oven at 60° C. for about 8 hours, and the evaporated sample had an NVS of 72%. The concentrated magenta ink was re-dispersed by adding back the same amount of oil-based carrier and stirring the mixture via high-speed mechanical stirring. The re-dispersed magenta pigment dispersion was printed using a piezoelectric ink jet printer having a Dimatix Q-class printhead at 45 volts, 7 µs, 50 kHz and a drop velocity of 7.6 m/s. The resulting print exhibited no satellites.

The third ink was a black ink. 5% black pigment (PBk6) and 1% dispersant were mixed with the oil-based carrier. The ink was mixed and sonicated in a probe sonicator at 50% amplitude for 30 minutes to reduce particle size in the dispersion. The mixture was added to a microfluidizer and processed at maximum pressure of 110 psi to disperse the pigments further. The black ink was processed in the microfluidizer for 30 minutes. The resulting ink was a black dispersion with conductivity of 238 pS/cm and an average particle size of 250 nm. The black dispersion was concentrated in an oven at 60° C. for about 8 hours, and the evaporated sample had an NVS of 24%. The concentrated black ink was redispersed by adding back the same amount of oil-based carrier and stirring the mixtures via high-speed mechanical stirring. The re-dispersed black pigment dispersion was printed using a piezoelectric ink jet printer having a Dimatix Q-class printhead at 45 volts, 7 µs, 50 kHz and a drop velocity of 7.2 m/s. The resulting print exhibited no satellites.

The fourth ink was a cyan ink. 5% cyan pigment (PB29) and 1% dispersant were mixed with the oil-based carrier. The ink was mixed and sonicated in a probe sonicator at 50% amplitude for 30 minutes to reduce particle size in the dispersion. The mixture was added to a microfluidizer and processed at maximum pressure of 110 psi to disperse the pigments further. The cyan ink was processed in the microfluidizer for 40 minutes. The resulting ink was a cyan dispersion with conductivity of 88 pS/cm and an average particle size of 500 nm. The cyan dispersion was concentrated in an oven at 60° C. for about 8 hours, and the evaporated sample had an NVS of 37%. The concentrated cyan ink was redispersed by adding back the same amount of oil-based carrier and stirring the mixture via high-speed mechanical stirring. The re-dispersed cyan pigment dispersion was printed using a piezoelectric ink jet printer having a Dimatix Q-class printhead at 45 volts, 6 µs, 50 kHz and a drop velocity of 7.1 m/s. The resulting print exhibited no satellites.

The oil-based carrier fluid and dispersant of these four example inks were not recovered after printing. However, it is believed that these components (namely carrier fluid containing at least some common dispersant at a common concentration) could be recycled and reused to generate new printable inks of any desirable color.

It is to be understood that the ranges provided herein include the stated range and any value or sub-range within the stated range. For example, an amount ranging from about 5 wt % to about 100 wt % should be interpreted to include not only the explicitly recited amount limits of about 5 wt % to about 100 wt %, but also to include individual amounts, such as 10 wt %, 25.5 wt %, 82 wt %, etc., and sub-ranges, such as 12 wt % to 37 wt %, etc. Furthermore, when "about" is utilized to describe a value, this is meant to encompass minor variations (up to +/−5%) from the stated value.

Furthermore, it is to be understood use of the words "a" and "an" and other singular referents include plural as well.

While several examples have been described in detail, it will be apparent to those skilled in the art that the disclosed examples may be modified. Therefore, the foregoing description is to be considered non-limiting.

What is claimed is:

1. An ink set, comprising:
   a first ink having:
   a first pigment of a first color;
   a non-polar, oil-based carrier fluid;
   a concentration of a dispersant; and
   a conductivity that is less than 200 pS/cm; and
   a second ink having:
   a second pigment of a second color that is different from the first color;
   the same non-polar, oil-based carrier fluid as the first ink;
   substantially the same concentration of the same dispersant as the first ink; and
   a conductivity that is less than 200 pS/cm.

2. The ink set as defined in claim 1 wherein the dispersant is a polyisobutylene succinimide having i) a polyisobutylene chain with a molecular weight ranging from about 800 to about 3000 and ii) an amine value ranging from about 10 mg KOH/g to about 100 mg KOH/g.

3. The ink set as defined in claim 2 wherein a concentration of each of the first pigment and the second pigment ranges from about 3 wt % to about 10 wt % of a total wt % of the first ink and the second ink, respectively; and wherein the concentration of the dispersant in each of the first ink and the second ink ranges from about 5 wt % to about 100 wt % with respect to a total pigment concentration.

4. The ink set as defined in claim 1, further comprising at least one other ink having:
   an other pigment of a color that is different from the first color and the second color;
   the same non-polar, oil-based carrier fluid as the first and second inks;
   substantially the same concentration of the same dispersant as the first and second inks; and
   a conductivity that is less than 200 pS/cm.

5. The ink set as defined in claim 1 wherein the first pigment and the second pigment each have an average diameter that is less than 500 nm.

6. The ink set as defined in claim 1 wherein the dispersant of the first ink, the second ink, or the first and the second ink contains a recycled dispersant, wherein the recycled dispersant is the dispersant of the first ink or the dispersant of the second ink after at least one instance of printing.

7. The ink set as defined in claim 6 wherein the recycled dispersant includes the same non-polar, oil-based carrier fluid as the first ink, the second ink, or the first and the second ink.

8. The ink set as defined in claim 1 wherein the non-polar, oil based carrier fluid is a hydrocarbon.

9. An ink set, comprising:
   a concentrated first ink having:
   a first pigment of a first color;
   a non-polar, oil-based carrier fluid;
   a concentration of a dispersant; and
   a concentrated second ink having:
   a second pigment of a second color that is different from the first color;
   the same non-polar, oil-based carrier fluid as the concentrated first ink;
   substantially the same concentration of the same dispersant as the concentrated first ink;
   wherein the concentrated first ink has a non-volatile solids content ranging from about 20 wt % to about 90 wt % based on a total wt % of the first concentrated ink, and has an amount of the non-polar, oil-based carrier fluid ranging from about 10 wt % to about 80 wt % based on the total wt % of the first concentrated ink; and wherein the concentrated second ink has a non-volatile solids content ranging from about 20 wt % to about 90 wt % based on a total wt % of the second concentrated ink, and has an amount of the same non-polar, oil-based carrier fluid ranging from about 10 wt % to about 80 wt % based on the total wt % of the second concentrated ink, each of the concentrated first and second inks to be redispersed in the non-polar, oil based carrier for printing.

* * * * *